United States Patent [19]
Solo et al.

[11] 3,897,035
[45] July 29, 1975

[54] WALL FASTENER

[75] Inventors: Alan J. Solo, Brooklyn, N.Y.

[73] Assignee: Knock-N-Lok International, Inc., Brooklyn, N.Y.

[22] Filed: May 31, 1974

[21] Appl. No.: 474,872

Related U.S. Application Data

[63] Continuation-in-part of Ser. No. 469,666, May 14, 1974, which is a continuation-in-part of Ser. No. 463,820, Apr. 24, 1974, which is a continuation-in-part of Ser. No. 454,393, March 25, 1974.

[52] U.S. Cl. .................... 248/217; 85/5 P; 85/21
[51] Int. Cl. ............................................. F16b 15/04
[58] Field of Search ......... 248/217; 85/23, 5 N, 5 P, 85/21, 27

[56] References Cited
UNITED STATES PATENTS

| | | | |
|---|---|---|---|
| 1,185,587 | 5/1916 | Bragg et al. | 248/217 |
| 1,631,044 | 5/1927 | Lytton | 85/23 |
| 2,910,752 | 11/1959 | Gagnier | 85/21 X |
| 2,927,497 | 3/1960 | Rapata | 85/21 X |
| 3,645,163 | 2/1972 | Byland | 85/21 X |

Primary Examiner—J. Franklin Foss
Attorney, Agent, or Firm—Friedman & Goodman

[57] ABSTRACT

A wall fastener includes an elongate shank having one end thereof pointed and suitable for being driven into a penetrable wall. A slotted head is provided at the other end of the shank suitable for being hammered to advance the pointed end in the shank through the penetrable material and for being engaged, such as with a screwdriver, to permit turning of the shank about the axis thereof. Two transverse projections are provided extending from diametrically opposite portions of the shank proximate to the pointed ends and normally aligned along a substantially straight line. The projections are integrally formed with the shank and are flexible to permit the same to be deformed and at least partially wrapped around the axial length of the shank. In this manner, hammering of the fastener into a penetrable wall causes the wall material to flex the projections to positions substantially coextensive with the shank. Engagement of the head and turning of the latter causes the projections to become twisted about the shank and wedged between the latter and the wall material to thereby fix the fastener in place and prevent the same from becoming separated from the wall. Advantageously, the projections are serated and provided with tapers to increase the retentive characteristics of the fastener. Protuberances may be provided on the shank between the point and the projections and angularly aligned with the latter to weaken the wall material and form a channel through which the projections may be passed without being damaged.

11 Claims, 9 Drawing Figures

PATENTED JUL 29 1975　　　　　　　　　　　3,897,035
SHEET 1
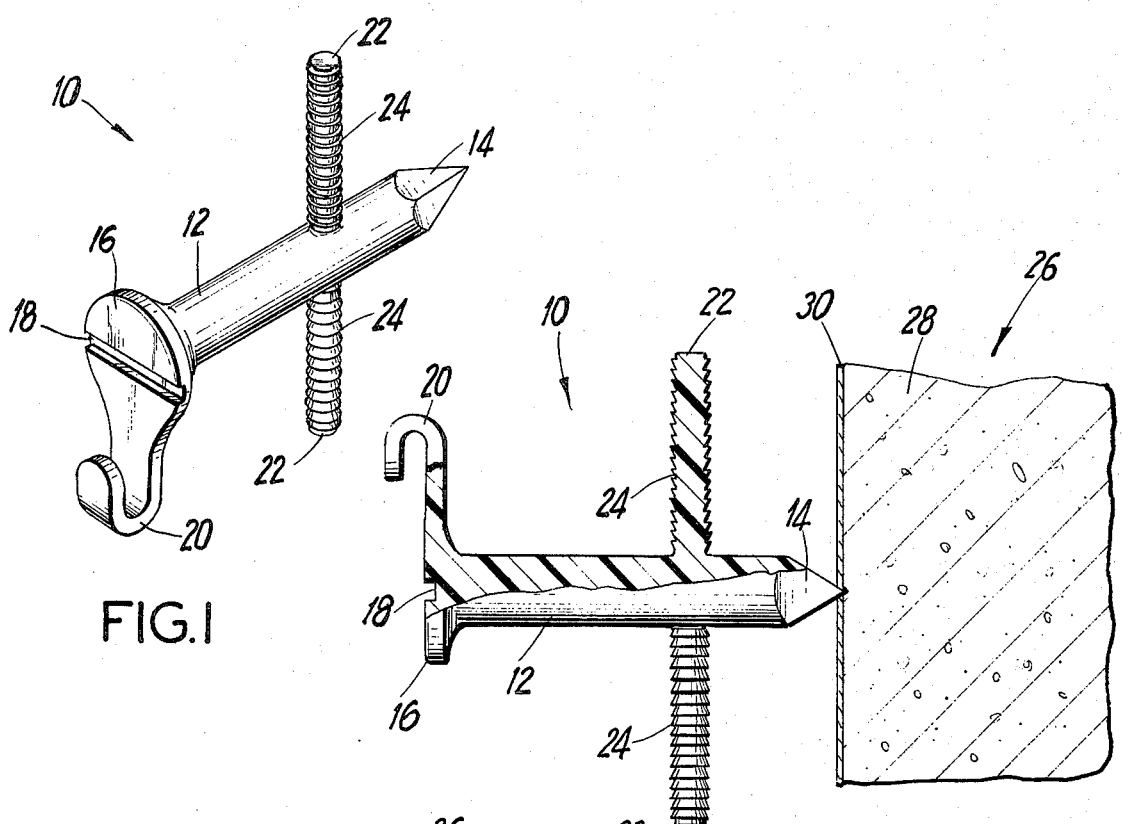
FIG.1
FIG.2
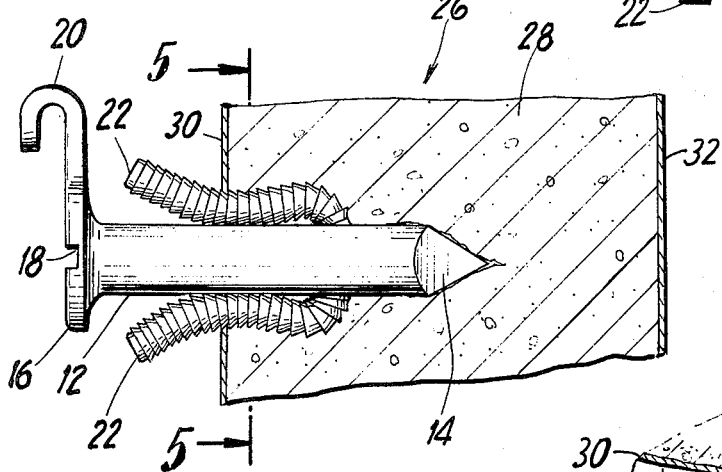
FIG.3
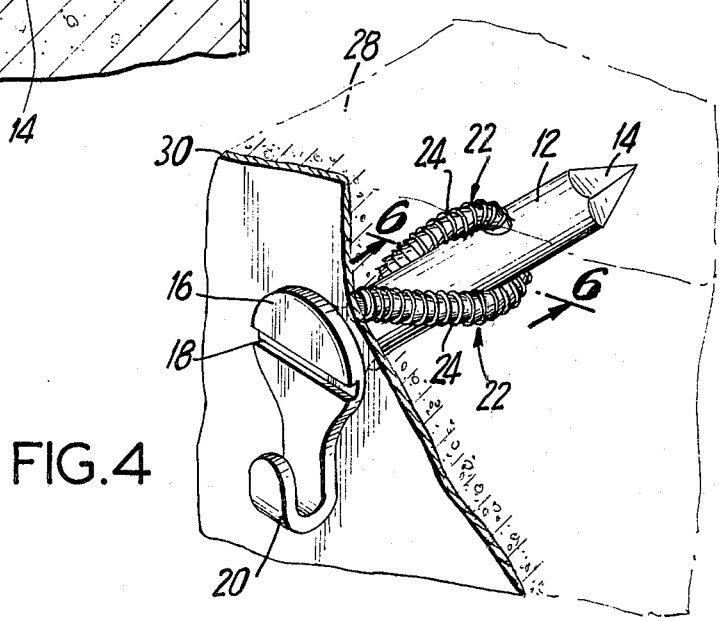
FIG.4

WALL FASTENER

CROSS REFERENCE TO RELATED APPLICATIONS

The present application is a continuation-in-part application of U.S. application Ser. No. 469,666, filed May 14, 1974, for SUPPORTING FASTENER, the latter application being a continuation-in-part application of U.S. application Ser. No. 463,820, filed Apr. 24, 1974, for LOCKABLE FASTENER, the latter application being a continuation-in-part application of U.S. application Ser. No. 454,393, filed Mar. 25, 1974, for WOOD ANCHORING NAIL.

BACKGROUND OF THE INVENTION

The present invention generally relates to fasteners, and particularly to an integrally formed wall fastener which can be driven into a brittle penetrable material, such as plaster board or the like, and which includes flexible projections which becomes twisted about the shank of the fastener and wedged between the latter and the wall material when the fastener is turned about its axis subsequent to being driven into the wall material.

Fasteners known in the art are generally described in my previous co-pending applications, of which this application is a continuation-in-part. Generally, prior art anchors which are to be driven into wall materials, such as plaster board, have either been complex in construction and therefore costly to manufacture, inconvenient to use or have failed to be fully effective insofar as the retentive power of the anchor is concerned once the latter penetrates the wall or surface. Many of the known anchors, for example, incorporate two or more elements which must interact in a particular fashion to provide the anchoring action. Clearly, the more elements which an anchor includes, the more complicated the construction of the anchor becomes and the more costly the anchor is to produce. The present invention is for a unitary wall fastener which is molded from a flexible material, such as nylon, and which is effective in being retained within a plaster board wall. The subject fastener is simple in construction and economical to manufacture and becomes fixed within the wall into which it is driven by simply turning the same about its axis. The wall fastener in the present invention has been determined to be extremely effective. Also, the wall fastener of the present invention can withstand very high extracting forces acting upon the fastener after the latter has been driven into a brittle penetrable material and locked in place.

SUMMARY OF THE INVENTION

Accordingly, it is an object of the present invention to provide a wall fastener which does not have the above disadvantages associated with prior art wall fasteners.

It is another object of the present invention to provide a wall fastener which is simple in construction and economical to manufacture.

It is still another object of the present invention to provide a wall fastener of the type under discussion which is particularly suitable for plaster board or gypsum board walls.

It is yet another object of the present invention to provide a wall fastener of the type under consideration which can be securely anchored in brittle penetrable materials.

It is a further object of the present invention to provide a wall fastener as suggested in the above objects which is integrally formed from at least a partially flexible material and which includes transverse arms or projections proximate to a pointed end of a shank of the fastener, the projections becoming twisted about the shank and wedged between the latter and the wall material when the fastener is turned about its axis.

It is still a further object of the present invention to provide a wall fastener which is generally in the form of a nail and which is integrally formed and includes a hook projecting from the head thereof, the hook being suitable for supporting a device once the fastener is driven into the wall material and turned about its axis.

In order to achieve the above objects, as well as others which will become apparent hereafter, the wall fastener of the present invention comprises an elongate shank. Said shank has one end thereof pointed and suitable for being driven into a penetrable wall. An engageable head at the other end of said shank is suitable for being hammered to advance the pointed end and said shank through the penetrable wall and for being engaged to permit turning of said shank about the axis thereof. At least one transverse projection is provided which extends from said shank proximate to the pointed end. Said projection is integrally formed with said shank and is flexible to permit the same to be deformed and at least partially wrapped around the axial length of the shank. In this manner, when the fastener is hammmered into a penetrable wall, this causes the wall material to flex the projection to a position substantially coextensive with said shank. Engagement of said head and turning of the latter, causing simultaneous rotation of said shank about the axis thereof, causes said projection to become twisted about said shank and wedged between the latter and the wall material to thereby lock the fastener in place and prevent the same from becoming separated from the wall.

In the presently preferred embodiment, two transverse projections are provided extending from diametrically opposite portions of said shank and normally aligned along a substantially straight line. Said engageable head is provided with a transverse slot suitable for being engaged by a screwdriver. Also, said support means includes a hook spaced from said head, whereby said head may be hammered without damaging said hook.

A protuberance is advantageously provided on said shank between said projection and the pointed end. Said protuberance is angularly aligned with said projection. In this manner, said protuberance weakens the wall material and forms a channel through which said projection may be passed without being damaged.

The presently preferred embodiment is further provided with serrations along the entire length thereof to increase the retaining action of the wall materials on the fastener. Tapering of the projections also increases the holding power. It has been found that satisfactory results are obtained when the connected portions of the projection have uniform cross sections while the free end portions thereof are tapered.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a perspective view of a wall fastener in accordance with the present invention;

FIG. 2 is a side elevational view of the fastener shown in FIG. 1, partially broken away to show the integral nature of the hook with the head and the transverse projection with the shank, showing the fastener about to be driven into a brittle penetrable material;

FIG. 3 is similar to FIG. 2, shown after the fastener is partially driven into the material;

FIG. 4 is a perspective view, partially broken away, showing the fastener fully driven into the material and turned 180° to twist the projections about the shank as shown;

DESCRIPTION OF THE PREFERRED EMBODIMENTS

Figure 5:
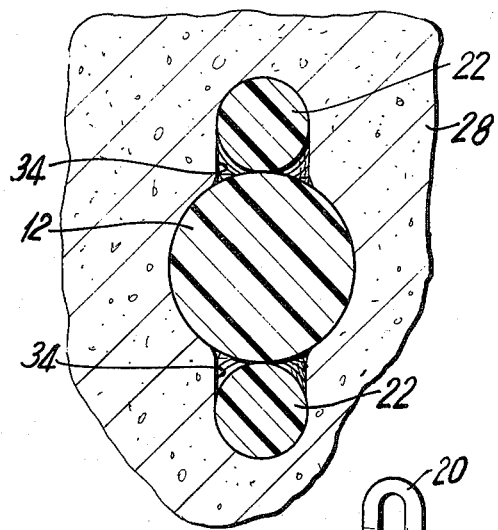
FIG. 5 is a cross section taken in FIG. 3, along line 5—5.

Referring now to the figures, wherein identical or similar parts are designated by the same reference numerals throughout, and first referring to FIG. 1, a wall fastener in accordance with the present invention is generally designated by the reference numeral 10.

The fastener 10 includes an elongate shank 12 having a point 14 at one end thereof suitable for being driven into a penetrable material. An engageable head 16 is provided at the other end of the shank 12 suitable for being hammered to advance the pointed end 14 and the shank 12 through the penetrable material. In the presently preferred embodiment, the head 16 is engageable by the provision of a transverse slot 18 suitable for being engaged by a screwdriver. However, any other means may be provided for engagement of the head 16 with a suitable tool for the purpose of rotating the shank 12 about its axis subsequent to being driven into the penetrable material. In appearance, the wall fastener 10 is in the nature of a nail at the leading end thereof and a screw at the trailing end thereof.

Support means in the form of a hook 20 is integrally formed with the head 16. The hook 20 is suitable for supporting an object after the shank 12 is driven into the wall and the head 16 is turned to bring the position of the hook 20 to that shown in FIG. 1. Advantageously, the hook is spaced from or slightly remote from the head itself to thereby prevent the hook from being damaged while the head is hit and the fastener is hammered into the wall.

An important feature of the present invention is the provision of at least one transverse projection 22 extending from the shank 12 proximate the pointed end 14 of the fastener. In the presently preferred embodiment shown in FIG. 1, two transverse projections 22 are provided extending from diametrically opposite portions of the shank 12 and normally aligned along a substantially straight line. The projections 22 are integrally formed with the shank 12, as shown in FIGS. 1 and 2.

The fastener 10 may be molded from any plastic material. The fastener may be made, for example, from nylon. As will become evident from the description that follows, the material used for forming the fastener 10 must be sufficiently rigid or strong to prevent being damaged while being driven into a penetrable material while being sufficiently flexible and resilient to permit bending of the projections 22. As clearly shown in FIG. 2, the entire fastener 10 is formed integrally, including the integral connection between the hook 20 and the head 16, as well as the integral connection between the transverse projections 22 and the shank 12. The projections 22 are made flexible both by selection of the material from which the fastener is made as well as by selection of the dimensions thereof.

For reasons which will become apparent hereafter, the projections 22 are serrated along at least a portion of the lengths thereof to increase the holding power of the fastener due to the increased retaining action of the wall material on the serrated projections 22 when the latter are wedged between the wall material and the shank 12. Advantageously, serrations 24 are provided along the entire lengths of the projections 22 as shown in FIGS. 1 and 2.

Referring to FIGS. 2–6, successive steps are shown of the manner in which the fastener 10 is driven into and fixed on a wall. In FIG. 2, a plaster board or gypsum wall board 26 is shown to include a plaster, gypsum or other brittle material section 28, and a front paper covering layer 30. The fastener 10 is positioned with its point 14 proximate to the paper covering layer 30 with the hook 20 in an upside down condition disposed above the head 16. It should be noted that the projections 22 are aligned along a line which is substantially normal to the direction of the slot 18. The hook 20, on the other hand, is substantially aligned with and parallel to the projections 22.

In FIG. 3, the fastener is shown partially driven into the plaster board wall 26. As shown in this figure, hammering of the fastener 10 into the penetrable wall 26 causes the wall material 28 to flex or bend the advancing projections 22 to positions substantially coextensive with the shank 12. Advantageously, the projections 22 extend from the shank 12 a predetermined distance from the head 16. The length of the projections 22 are made approximately equal to that predetermined distance. In this manner, the free ends of the projections 22 become disposed proximate to the head 16 when the projections are flexed subsequent to full entry of the shank 12 into a wall prior to turning of the latter, as suggested in FIG. 3.

The length of the shank 12 may be selected to correspond to the thickness of the plaster board 26, to substantially extend between the front and rear paper covering layers 30 and 32 respectively, once the fastener is fully driven into the wall, as shown in FIG. 4. However, it is not necessary that the pointed end 14 extend to the rear paper covering layer 32, so long as the projections 22 are substantially contained within the plaster board 26. It is the interaction between the shank 12, the projections 22 and the plaster or gypsum 28 which results in the high retention characteristic of the subject fastener.

Referring to FIG. 5, it will be noted that the projections 22 generate grooves or elongate channels 34 as the shank is driven into the wall material 28. In most instances, a hole need not be pre-drilled in the plaster board 26, it being sufficient that the fastener be hammered in as suggested in FIGS. 2 and 3. When the fastener 10 is driven into a wall, the plaster or gypsum material 28 through which it is so driven is shattered and at least partially weakened in the regions around the shank 12. For shanks having one-eighth inch diameter and smaller, a hole need generally not be pre-drilled in the wall material. However, it has been found that improved results are obtained in the use of fasteners having shank diameters greater than one-eighth of an inch when a hole is pre-drilled having a diameter corresponding to that of the fastener shank 12. The pre-drilling of a hole in this manner maintains the integrity of the plaster material in the region where the fastener is driven in. This results in improved holding power of the fastener 10.

Once the nail is fully driven into the plaster material, with the hook 20 still in the initial upper position as shown in FIGS. 2 and 3, the head 16 of the fastener is engaged, here by inserting a screwdriver point into the slot 18, and the head is turned 180° to bring the hook 20 to the lower position shown in FIG. 4. The hook is now in position to support an object such as a picture frame. Clearly, the amount of rotation which is necessary is also a function of the initial position of the hook 20.

Figure 6:
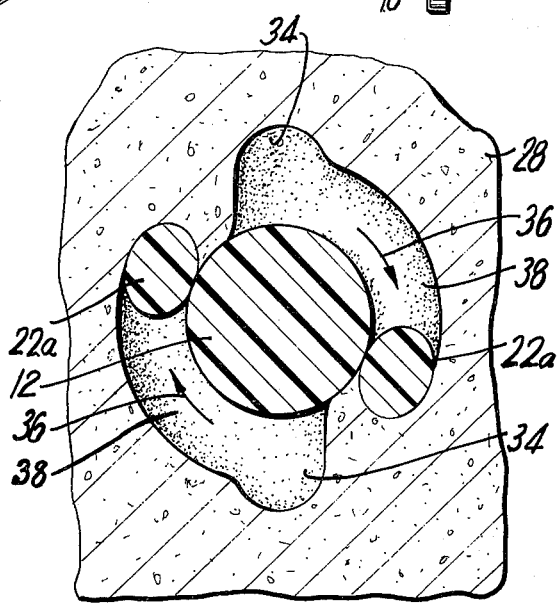
FIG. 6 is a cross section taken in FIG. 4 along line 6—6.
Figure 9:
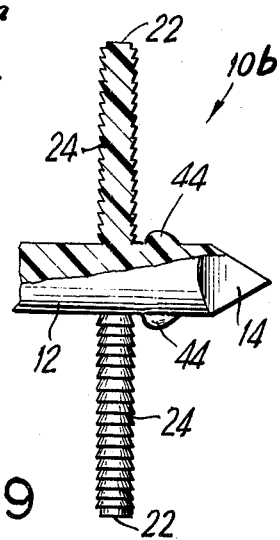
FIG. 9 is a still further embodiment of the fastener of the present invention.

Turning the head 16 and the hook 20 as described also causes simultaneous turning of the shank about the axis thereof. Since the projections 22 are integral with the shank 12, these flex and become twisted about the shank and the resiliency of the projections cause the latter to tend to flare radially outwardly from the axis of the shank as shown in FIGS. 3 and 4 and become wedged between the latter and the wall material 28. This is illustrated in FIG. 6 wherein the transverse projections 22 of FIG. 5 are shown to be wedged between the shank 12 and the plaster or gypsum material 28. Accordingly, the transverse projections 22a are shown to be slightly deformed as the shank is turned in a clockwise direction, indicated by the arrows 36 to generate a space 38 whose radial dimension is slightly smaller than that of the groove or elongated channel 34. For this reason, the transverse projections 22a are in a state of compression, this improving the wedging action and the retaining power of the fastener 10.

Figure 7:
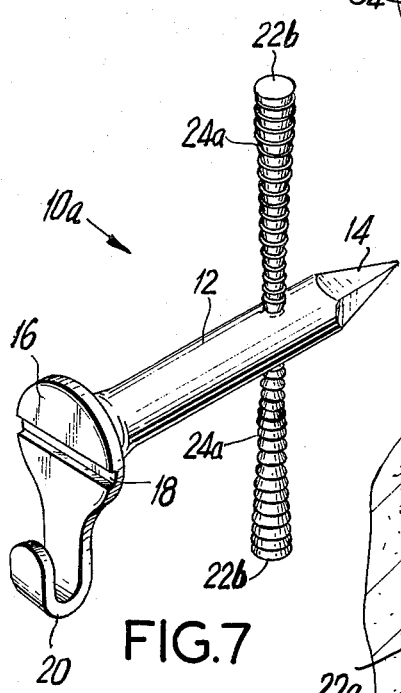
FIG. 7 is a perspective view of another embodiment of the fastener of the present invention.
Figure 8:
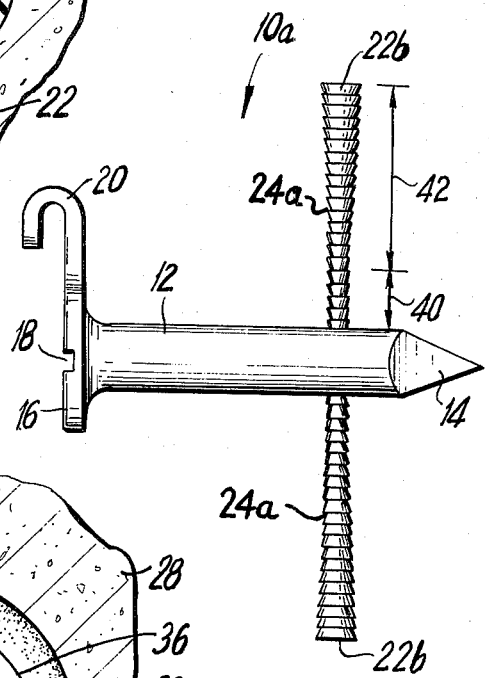
FIG. 8 is a side elevational view of the fastener shown in FIG. 7.

Referring to FIGS. 7 and 8, a second embodiment of the wall fastener 10a is shown which is similar to the first described embodiment except that the transverse projections 22b are at least partially tapered along the length thereof. Serrations 24a are provided, as before, over the entire length of the projections.

The projections in each case include a connected portion integrally joined to the shank 12 and a free end portion at the other or remote end of the projection. It has been determined experimentally that satisfactory performance is achieved when a length of the projections 22b at the connected portion is of substantially uniform cross section while the rest of the projection is tapered. In FIG. 8, the projections 22b are of uniform cross section over a length corresponding to distance 40. The length corresponding to distance 42 is tapered, with the cross sectional dimensions becoming greater towards the free end. This construction is advantageous for several reasons. Firstly, the connected portions of the projections 22b are more flexible and more suitable for being bent upon initial entry into the wall board 26 to positions corresponding to those shown in FIG. 3. On the other hand, once the fastener is turned, as described above, the tapered free end portions of the projections are drawn into the spaces 38 with increasingly greater resistance. This enhances the wedging action and consequently the retaining power of the fastener.

Plaster or gypsum material 28 can be very abrasive and shear or otherwise damage the projections 22 when the same are first driven into the wall material. Shearing of the projections is particularly acute when the connected portions of tapered projections are reduced in cross sectional dimensions to enhance their flexibility. To prevent direct initial contact between the leading or connected portion of the projections with the abrasive plaster or gypsum material during initial entry, a protuberance in the form of a nipple 44 is advantageously provided on the shank 12 between each projection 22 and the pointed end 14. The nipples 44 are angularly aligned on the shank 12 with the projections 22. In this manner, the nipples 44 weaken the the wall material 28 and form channels through which the projections 22 may be passed without being damaged. In effect, the nipples 44 assist in the generation of the grooves or elongate channels 34, instead of the latter being totally formed by the advancing action of the connected portions of the projections 22.

It has been determined in experiments that wall fasteners of the type above described are extremely effective when used in conjunction with brittle penetrable materials such as plaster board or gypsum wall board. As suggested above, this effectiveness is frequently achieved without the need to first pre-drill holes for the shank 12. The wall fastener of the present invention is extremely advantageous due to its simple, single molded construction and economy of manufacture. In the use of the wall fastener 10, it is merely necessary to drive the same through a wall as with a nail and subsequently turn the fastener approximately 180°, or any other suitable angular rotation, to twist the projections 22 about the shank 12 in wedged condition between the latter and the wall material. Accordingly, the use of these fasteners is extremely simple. This reduces the time and the cost in the use of these fasteners.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A wall fastener for use in relatively brittle penetrable walls comprising an elongate shank, said shank having one end thereof pointed and suitable for being driven into a penetrable wall; an engageable head at the other end of said shank suitable for being hammered to advance the pointed end of said shank through the penetrable wall and for being engaged to permit turning of said shank about the axis thereof; at least one transverse projection extending from said shank proximate to the pointed end, said projection being integrally formed with said shank and being flexible and resilient to permit the same to be deformed and at least partially wrapped about the axial length of said shank, whereby hammering the fastener into a penetrable wall causes the wall material to flex said projection to a position substantially coextensive with said shank, and engagement of said head and turning of the latter, to thereby cause simultaneous rotation of said shank about the axis thereof, causes said projection to flex and become twisted about said shank, the resiliency of said projections causing the same to tend to flare radially outwardly from the axis of said shank to become wedged between the latter and the wall material to thereby secure the fastener in place and resist the same from becoming removed from the wall.

2. A wall fastener as defined in claim 1, wherein said engageable head is provided with a transverse slot suitable for being engaged by a screwdriver.

3. A wall fastener as defined in claim 1, further comprising support means integrally formed with said head, said support means being positionable to support an object after said shank is driven into the wall and said head is turned to twist said projection about said shank.

4. A wall fastener as defined in claim 3, wherein said support means includes a hook spaced from said head, whereby said head may be hammered without damaging said hook.

5. A wall fastener as defined in claim 1, wherein two transverse projections are provided extending from diametrically opposite portions of said shank and normally aligned along a substantially straight line.

6. A wall fastener as defined in claim 1, wherein said projection is serrated along at least a portion of the length thereof to increase the holding power of the fastener due to the increased retaining action of the wall material on said projection when the latter is wedged between the wall material and said shank.

7. A wall fastener as defined in claim 6, wherein serrations are provided along the entire length of said projections.

8. A wall fastener as defined in claim 1, wherein said projection extends from said shank a predetermined distance from said head, the length of said projection being approximately equal to said predetermined distance, whereby the free end of said projection is disposed proximate said head when said projection is flexed during entry into a wall prior to turning of said shank.

9. A wall fastener as defined in claim 1, wherein said projection is at least partially tapered along its length.

10. A wall fastener as defined in claim 9, wherein said projection includes a connected portion and a free end portion, said free end portion being tapered and said connected portion having a uniform cross section.

11. A wall fastener as defined in claim 1, further including a protuberance on said shank between said projection and the pointed end, said protuberance being angularly aligned with said projection, whereby said protuberance weakens the wall material and forms a channel through which said projection may be passed without being damaged.

* * * * *